Patented Sept. 21, 1926.

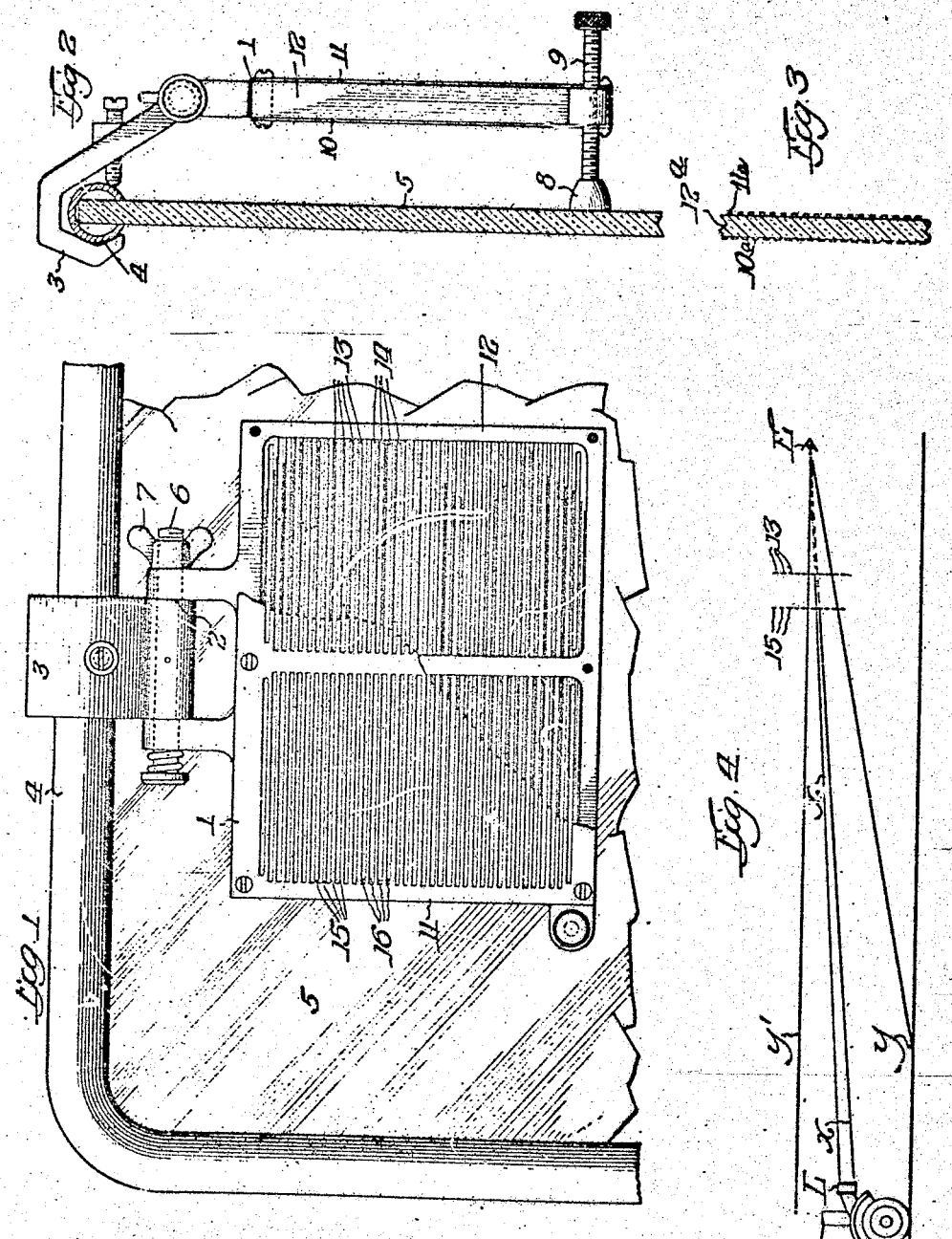
Sept. 21, 1926.
E. S. ENSIGN
ANTIGLARE SCREEN
Original Filed Jan. 5, 1924
1,600,461

1,600,461

UNITED STATES PATENT OFFICE.

EMORY S. ENSIGN, OF BOSTON, MASSACHUSETTS.

ANTIGLARE SCREEN.

Application filed January 5, 1924, Serial No. 684,495. Renewed February 15, 1926.

This invention relates to a screen to be interposed between the eye of an observer and a source of light, with the effect of intercepting a volume of the light, and particularly the direct rays thereof, sufficiently to render the light unobjectionable to the observer, and without seriously impairing observation of conditions immediately adjacent the source of light.

The invention proceeds upon the principle of providing between the eye of the observer and the light source to be combatted, a screen composed of two spaced gratings or equivalent structures, each of which consists of alternated bars and spaces of such small dimensions and consequent frequency of occurrence as to pass an approximately complete image through the screen when the spaces of the respective gratings coincide with a line or lines of vision, while in one or more other lines of vision the bars of one grating will be in occultation with the spaces of the other grating and wholly intercept light directed in such line, or intercept the direct rays thereof, permitting only diffused light to pass; the screen being mounted for adjustment in a manner to bring it, at will, into a plane that will cause the line of obscured vision to coincide with the light to be combatted, while the lines of open vision reach to the object, for instance, a road surface to be kept under observation.

While the invention is susceptible of being embodied in various forms, and even in the form of goggles to be worn by a driver; it is preferably embodied in a screen supported within reach of a driver through means which permit it to be brought into and out of his general direction of vision and to be arrested at varying angles to such general line of vision.

In the accompanying drawing, in which such preferred embodiment is shown by way of illustration,—

Figure 1 is a fragmentary view of an automobile windshield in which the device is shown in elevation.

Figure 2 is a view of the same in end elevation.

Figure 3 is a detail view showing a modified method of securing two spaced and transparent gratings; and Figure 4 is a schematic view illustrating the effect of the device.

1 represents a screen which is equipped in any suitable manner to be supported before the eyes of a driver or other observer, for instance, by providing it with hinging connection 2, and a bracket 3 adapted to the top rail 4 of an automobile windshield 5, so that the screen can swing in a vertical plane to and from position affecting the observation of the driver. Hinging connection 2 will be preferably adjustable through means of bolt and nut 6, 7, to vary the friction with which it moves upon the bracket 3, and thus retain it in any position to which it is positively forced; and screen 1 will preferably be provided with a stop 8 that determines the angle at which the screen will be arrested with relation to the line of vision, or with relation to the windshield, which in turn may be utilized to determine a plane of the screen. Preferably, the stop 8 embodies in its structure an adjusting screw 9 which permits adjustment, at will, of the angle, relative to windshield 5, at which the screen is to be arrested.

Screen 1 is composed of front and rear gratings 10 and 11 mounted upon a frame 12 or otherwise definitely spaced apart, and these gratings are composed, each, of bars 13 with alternating spaces 14 in one screen and similar bars 15 with alternating spaces 16 in the other screen. The bars and spaces are of substantially equal dimensions in the direction of the plane of the screen, so that when a line of vision directed through the screen is at an angle, for instance on the lines E—X of Figure 4, which intercepts a space in one screen and a bar in the other, vision will be obscured or so far reduced in the extent of the image produced as to render it inoffensive to the eye. Thus, if such line of vision coincides with the rays of an objectionably bright light L (Figure 4) the light will be intercepted either altogether or to a degree to render it unobjectionable. If not completely intercepted, the image of the light may be reduced to merely that resulting from diffraction and thus be helpful to the driver, in that the driver can realize the position of the opposing vehicle without suffering the disadvantage of its blinding rays. But while one line of vision may thus obscure the passage of light over a sufficient area of the screen to serve as a substantial protection against the glare of the opposing light, the lines of vision at relatively small angles thereto, for instance the lines E—Y, E—Y' (Figure 4) and at such angles as will permit observation of the entire surface of the road between the vehicles, will coincide with spaces in both screens and afford an observation sufficiently clear to enable the driver to realize road conditions; and in this, the opposing light, having been eliminated as a direct influence upon the drver's eyes, becomes an assistance to safe driving rather than a menace. The gratings can be mounted upon their frame or other supporting body with corresponding bars and spaces in any desired relative positions, it being only necessary to select the angle of the screen as a whole that will cause the bars of one grating to eclipse the spaces of another grating, when the vision is in a line which would coincide with the blinding light to be subdued, and inasmuch as opposing headlights are, within close limits, at a more or less constant distance from the ground, and variations in level or angle of the light beam effect but slight changes in the angle of projection, it is found by experiment to be quite easy to select a position for the screen which is quite effective in results produced.

Instead of using a frame 12 with screens 10 and 11 on opposite sides thereof, as shown in Figures 1 and 2, the support may be in the form of a clear glass plate 12ª (Figure 3) with bars 10ª and 11ª fixed to opposite surfaces thereof, either as attached physical bars or as comparatively opaque etchings, painted stripes, strips of tinfoil, or other sheet material, etc.; the thickness of the glass foundator 12ª being sufficient to develop the desired spacing of the gratings.

The bars of one grating may correspond in position with the bars of the other grating, as shown in Figures 1 and 2, with the advantage of permittitng both gratings to be stamped with a single die, and with vision clear in lines perpendicular to the plane of the screen and obscured when at some angles thereto; or as shown in Figure 3, the bars of one grating may be opposite the spaces in the other grating, so that vision is obscure when in a line perpendicular to the screen and clear at most angles thereto. In either case, the two effects which the screen produces are properly related to the views presented, by determining the angle of the screen.

Light-intercepting portions of the double grating screen will always be in effective position between the eye and the source of light to be obscured and the space affording clear vision will similarly exist in line with the road surface at all times of changes in the level of the eye, whether due to position which the driver assumes, or resilient action of the seat.

In practice, I have obtained good results by using gratings in which the bars are one-sixteenth ($\frac{1}{16}$th) of an inch in width and the intervening spaces are of the same width as the bars, so that the bars occur at the frequency of about eight (8) to the inch, but these dimensions may be varied if desired.

I claim:—

1. An anti-glare vision shield, comprising a screen composed of spaced gratings, each of which consists of a series of light controlling bars alternated with spaces and adapted by occultation of bars of one grating with spaces of the other grating to affect the passage of light in a line of vision coinciding with such bars and spaces, while leaving unobstructed lines of vision passing through spaces in both gratings.

2. An anti-glare screen, composed of a pair of spaced gratings, superposed in a line of vision each consisting of alternating bars and spaces.

3. An anti-glare screen, composed of a pair of gratings, spaced apart and superposed in a line of vision, each consisting of alternating bars and spaces of substantially identical dimensions.

4. An anti-glare screen, composed of a pair of gratings, spaced apart and superposed in a line of vision, each consisting of alternating bars and spaces; the bars of one grating corresponding in width substantially to the spaces of the other grating.

5. An anti-glare screen, composed of a pair of gratings, superposed and spaced apart in a line of vision, each consisting of alternating bars and spaces, and means for supporting said screen in a plane at a definite angle to the line of vision.

6. An anti-glare screen, composed of a pair of gratings, superposed and spaced apart in a line of vision, each consisting of alternating bars and spaces, and means for supporting said screen in a plane at a definite angle to the line of vision, and varying such angle at will.

7. An anti-glare screen, composed of a pair of gratings spaced apart and superposed in the general direction of vision, a bracket upon which said screen is movably supported, and an adjustable stop adapted to arrest said screen at varying angles to said direction of vision.

Signed at Chicago, Illinois, this 13th day of December, 1923.

EMORY S. ENSIGN.